United States Patent
Sagawa

(10) Patent No.: US 8,643,739 B2
(45) Date of Patent: Feb. 4, 2014

(54) IMAGE RECOGNITION APPARATUS, PROCESSING METHOD THEREOF, AND COMPUTER-READABLE STORAGE MEDIUM

(75) Inventor: Naotsugu Sagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 12/902,876

(22) Filed: Oct. 12, 2010

(65) Prior Publication Data
US 2011/0090359 A1    Apr. 21, 2011

(30) Foreign Application Priority Data
Oct. 20, 2009    (JP) .................................. 2009-241887

(51) Int. Cl.
| | |
|---|---|
| H04N 5/228 | (2006.01) |
| H04N 7/18 | (2006.01) |
| G06K 9/46 | (2006.01) |
| G06K 9/66 | (2006.01) |
| G06K 9/62 | (2006.01) |
| G06K 9/74 | (2006.01) |
| G06K 9/68 | (2006.01) |

(52) U.S. Cl.
USPC ........ 348/222.1; 348/135; 382/190; 382/199; 382/209; 382/213; 382/214; 382/219

(58) Field of Classification Search
USPC .......... 348/169–172, 222.1, 86–95, 125–142; 382/181–231, 115–165, 168–172
See application file for complete search history.

(56) References Cited

U.S. PATENT DOCUMENTS

| | | | | |
|---|---|---|---|---|
| 5,475,766 | A | * 12/1995 | Tsuchiya et al. | .............. 382/144 |
| 5,554,983 | A | 9/1996 | Kitamura et al. | |
| 5,969,753 | A | * 10/1999 | Robinson | ..................... 348/130 |

(Continued)

FOREIGN PATENT DOCUMENTS

| | | |
|---|---|---|
| JP | 5-298591 A | 11/1993 |
| JP | 2003-044860 A | 2/2003 |

(Continued)

OTHER PUBLICATIONS

Viola, et al., "Rapid Object Detection using a Boosted Cascade of Simple Features", Proceedings of the IEEE Conference on Computer Vision and Pattern Recognition, 2001.

(Continued)

*Primary Examiner* — Lin Ye
*Assistant Examiner* — Chia-Wei A Chen
(74) *Attorney, Agent, or Firm* — Fitzpatrick, Cella, Harper & Scinto

(57) ABSTRACT

An image recognition apparatus includes: a storage unit configured to store a dictionary used to recognize a predetermined pattern; a recognition unit configured to detect in image data using the dictionary, as recognition results, a plurality of partial regions having a likelihood of being the predetermined pattern greater than a predetermined threshold; a display unit configured to display the image data, and also display information indicating the partial regions that were detected by the recognition unit; a determination unit configured to determine, based on an instruction by a user, a negative region from among the plurality of partial regions that were detected by the recognition unit; a generation unit configured to generate a learning image based on the determined negative region; and an update unit configured to update the dictionary based on the learning image that was generated by the generation unit.

9 Claims, 9 Drawing Sheets

(56) References Cited

U.S. PATENT DOCUMENTS

| | | | |
|---|---|---|---|
| 6,421,463 B1* | 7/2002 | Poggio et al. | 382/224 |
| 6,940,545 B1* | 9/2005 | Ray et al. | 348/222.1 |
| 6,956,469 B2* | 10/2005 | Hirvonen et al. | 340/435 |
| 7,099,504 B2* | 8/2006 | Blake et al. | 382/159 |
| 7,110,584 B2* | 9/2006 | Onami et al. | 382/128 |
| 7,742,627 B2* | 6/2010 | Terakawa | 382/118 |
| 7,773,801 B2* | 8/2010 | Kanda | 382/159 |
| 7,889,892 B2* | 2/2011 | Terakawa | 382/118 |
| 8,116,533 B2* | 2/2012 | Kiplinger et al. | 382/112 |
| 8,160,309 B1* | 4/2012 | Tzur et al. | 382/118 |
| 8,233,678 B2* | 7/2012 | Ogawa | 382/118 |
| 2002/0149613 A1* | 10/2002 | Gutta et al. | 345/728 |
| 2004/0179719 A1* | 9/2004 | Chen et al. | 382/118 |
| 2005/0195076 A1* | 9/2005 | McCulloch et al. | 340/500 |
| 2005/0207649 A1* | 9/2005 | Enomoto et al. | 382/190 |
| 2006/0126946 A1* | 6/2006 | Denoue et al. | 382/229 |
| 2006/0170791 A1* | 8/2006 | Porter et al. | 348/231.3 |
| 2006/0198554 A1* | 9/2006 | Porter et al. | 382/159 |
| 2007/0047822 A1* | 3/2007 | Kitamura et al. | 382/224 |
| 2007/0127816 A1* | 6/2007 | Balslev et al. | 382/181 |
| 2008/0016016 A1* | 1/2008 | Mitarai et al. | 706/25 |
| 2008/0021302 A1* | 1/2008 | Kaiser | 600/407 |
| 2008/0069477 A1* | 3/2008 | Engels et al. | 382/291 |
| 2008/0123907 A1* | 5/2008 | Eura et al. | 382/118 |
| 2008/0192122 A1* | 8/2008 | Izawa | 348/207.99 |
| 2008/0192981 A1* | 8/2008 | Murphy | 382/103 |
| 2008/0247611 A1* | 10/2008 | Aisaka et al. | 382/118 |
| 2008/0317379 A1* | 12/2008 | Steinberg et al. | 382/275 |
| 2009/0074295 A1* | 3/2009 | Napper | 382/186 |
| 2009/0244291 A1* | 10/2009 | Saptharishi et al. | 348/187 |
| 2009/0252395 A1* | 10/2009 | Chan et al. | 382/131 |
| 2010/0021008 A1* | 1/2010 | Shaick | 382/103 |
| 2010/0040288 A1* | 2/2010 | Yen et al. | 382/195 |
| 2010/0054549 A1* | 3/2010 | Steinberg et al. | 382/118 |
| 2010/0103279 A1* | 4/2010 | Shiratani | 348/222.1 |
| 2010/0171826 A1* | 7/2010 | Hamilton et al. | 348/135 |
| 2010/0172579 A1* | 7/2010 | Reid et al. | 382/165 |
| 2010/0287053 A1* | 11/2010 | Ganong et al. | 705/14.66 |
| 2011/0182485 A1* | 7/2011 | Shochat et al. | 382/118 |
| 2012/0008837 A1* | 1/2012 | Goldberg et al. | 382/118 |

FOREIGN PATENT DOCUMENTS

| | | |
|---|---|---|
| JP | 2006-301779 A | 11/2006 |
| JP | 2008-262331 A | 10/2008 |
| JP | 2009-064079 A | 3/2009 |

OTHER PUBLICATIONS

Dalal, et al., "Histograms of Oriented Gradients for Human Detection", IEEE Computer Vision and Pattern Recognition, vol. 1, pp. 886-893, 2005.

Grabner, et al., "On-line Boosting and Vision", Proceedings of the IEEE Conference on Computer Vision and Pattern Recognition, 2006.

Oza, "Online Bagging and Boosting", Eighth International Workshop on Artificial Intelligence and Statistics, pp. 105-112, Jan. 2001.

Japanese Office Action dated Jun. 18, 2013 corresponding to Japanese Application No. 2009-241887.

* cited by examiner

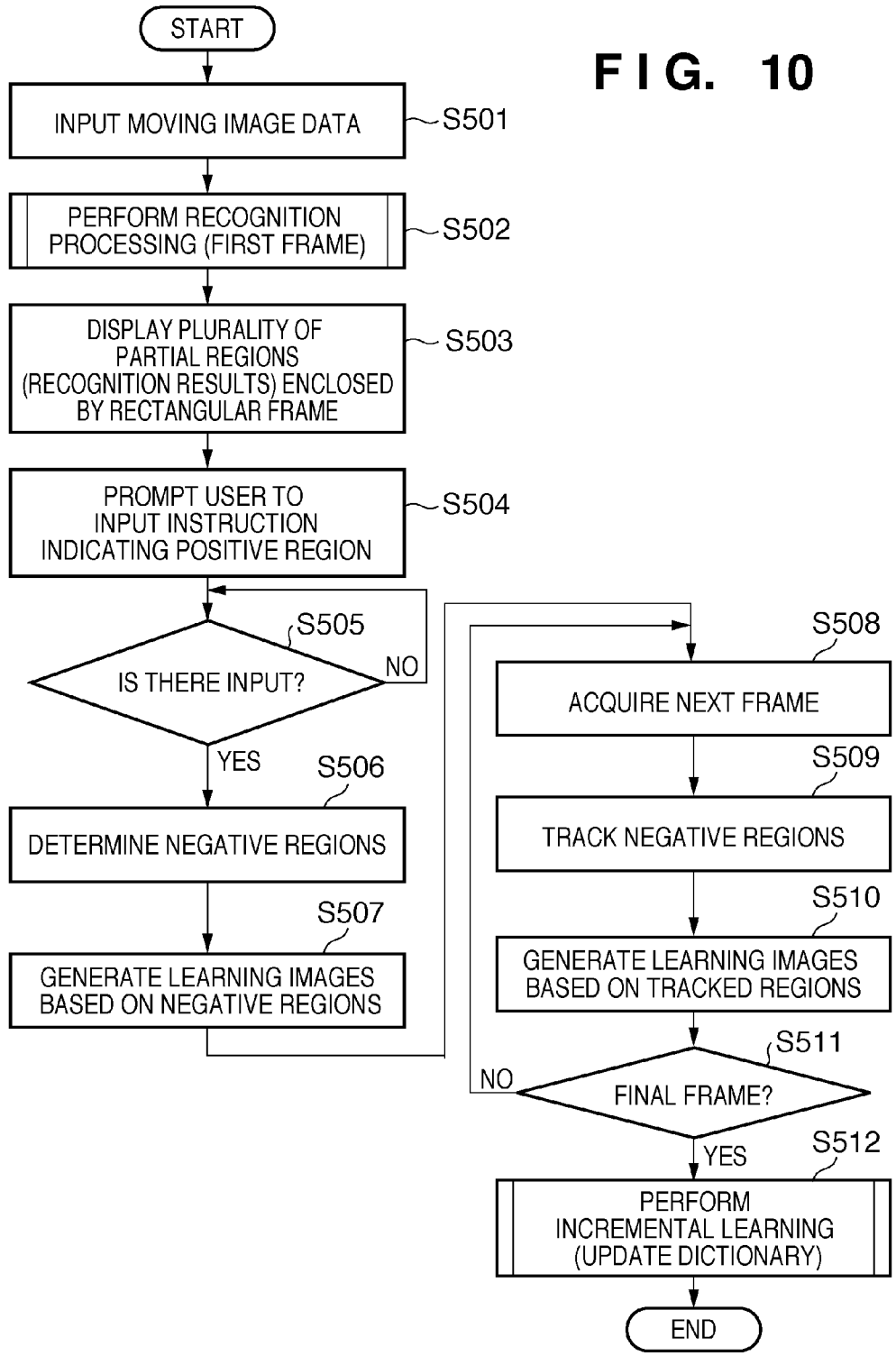
F I G. 10

IMAGE RECOGNITION APPARATUS, PROCESSING METHOD THEREOF, AND COMPUTER-READABLE STORAGE MEDIUM

BACKGROUND OF THE INVENTION

1. Field of the Invention

The present invention relates to an image recognition apparatus configured to recognize a predetermined pattern, a processing method thereof, and a computer-readable storage medium.

2. Description of the Related Art

Technology (image recognition technology) for recognizing a predetermined pattern (for example, an object) within image data is known. For example, in a digital camera, exposure and focus are set to the region of an object that was recognized using this technology. Also, for example, in a personal computer device, image recognition processing is performed, an image is automatically classified, and the image is effectively edited and corrected (see Viola and Jones, "Rapid Object Detection using Boosted Cascade of Simple Features", Proceedings of the IEEE Conference on Computer Vision and Pattern Recognition (CVPR 2001)(referred to below as Document 1), and Navneet Dalal and Bill Triggs, "Histograms of Oriented Gradients for Human Detection", IEEE Computer Vision and Pattern Recognition, Vol. 1, pp. 886-893, 2005 (referred to below as Document 2).

With this sort of technology, a plurality of learning images, namely positive images that are correct patterns and negative images that are incorrect patterns, are prepared, and by performing machine learning based on image features that are useful for discriminating these patterns, a dictionary for recognizing correct patterns is generated.

Factors affecting recognition accuracy include the image features used for pattern discrimination and the learning images used for machine learning. Image features that are useful depending on the recognition target have been studied. For example, it is known that Haar-like features are useful image features if the recognition target is a face, and HOG (Histograms of Oriented Gradients) features are useful image features if the recognition target is a human body.

As for the learning images, there have been attempts to improve accuracy by increasing the number and type of positive images and negative images. Also, when known in advance that patterns are difficult to detect or will be mistakenly detected, accuracy for specific patterns has been improved by emphasizing learning of images for those patterns.

On the other hand, as an application of such recognition technology, in Grabner and Bischof, "On-line Boosting and Vision", Proceedings of the IEEE Conference on Computer Vision and Pattern Recognition (CVPR 2006)(referred to below as Document 3), technology is disclosed whereby images (learning images) for machine learning are automatically collected in a device, and incremental learning of those learning images is performed. Thus, an original dictionary is updated within the device, thereby realizing an improvement in dictionary accuracy.

In this sort of incremental learning, learning images are automatically collected within the device. As described in Document 3, a method is known in which a desired object is tracked relative to continuous image frames, and positive images are automatically collected. In this method, because learning images that include variations in the direction, size, and so forth of the desired object can be effectively collected, each time that incremental learning is performed, an image pattern that heretofore could not be detected gradually becomes detectable.

On the other hand, for negative images, a method is conceivable in which merely images other than positive images are collected. However, the negative images that can be collected by this method are only patterns that are not positive, and in particular, it is not possible to concentratedly collect only patterns that are similar to positive but are not positive. Therefore, even if incremental learning has been performed, the problem may occur that a pattern similar to the desired object but actually not a correct pattern is mistakenly detected.

SUMMARY OF THE INVENTION

The present invention provides technology for collecting learning images, and more specifically provides technology for enabling effective collection of negative images including a similar pattern that is likely to be mistakenly recognized as a predetermined pattern.

According to a first aspect of the present invention there is provided an image recognition apparatus, comprising: a storage unit configured to store a dictionary used to recognize a predetermined pattern; a recognition unit configured to detect in image data using the dictionary, as recognition results, a plurality of partial regions having a likelihood of being the predetermined pattern greater than a predetermined threshold; a display unit configured to display the image data, and also display information indicating the plurality of partial regions; a determination unit configured to determine, based on an instruction by a user, a negative region from among the plurality of partial regions; a generation unit configured to generate a learning image based on the determined negative region; and an update unit configured to update the dictionary based on the learning image.

According to a second aspect of the present invention there is provided a processing method in an image recognition apparatus, the method comprising: detecting in image data using a dictionary for recognizing a predetermined pattern, as recognition results, a plurality of partial regions having a likelihood of being the predetermined pattern greater than a predetermined threshold; displaying the image data, and also displaying information indicating the plurality of partial regions; determining, based on an instruction by a user, a negative region from among the plurality of partial regions; generating a learning image based on the determined negative region; and updating the dictionary based on the learning image.

According to a third aspect of the present invention there is provided a computer-readable storage medium storing a computer program for causing a computer to function as: a storage unit configured to store a dictionary used to recognize a predetermined pattern; a recognition unit configured to detect in image data using the dictionary, as recognition results, a plurality of partial regions having a likelihood of being the predetermined pattern greater than a predetermined threshold; a display unit configured to display the image data, and also display information indicating the plurality of partial regions; a determination unit configured to determine, based on an instruction by a user, a negative region from among the plurality of partial regions; a generation unit configured to generate a learning image based on the negative region that was determined by the determination unit; and an update unit configured to update the dictionary based on the learning image.

Further features and aspects of the present invention will become apparent from the following description of exemplary embodiments with reference to the attached drawings.

BRIEF DESCRIPTION OF THE DRAWINGS

FIG. 10 is a flowchart that shows an example of operation of a digital camera 10 according to Embodiment 3.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. In this embodiment(s), by way of example, a case is described where an image recognition apparatus according to an embodiment of the present invention is applied to a digital camera.

Embodiment 1

Figure 1:
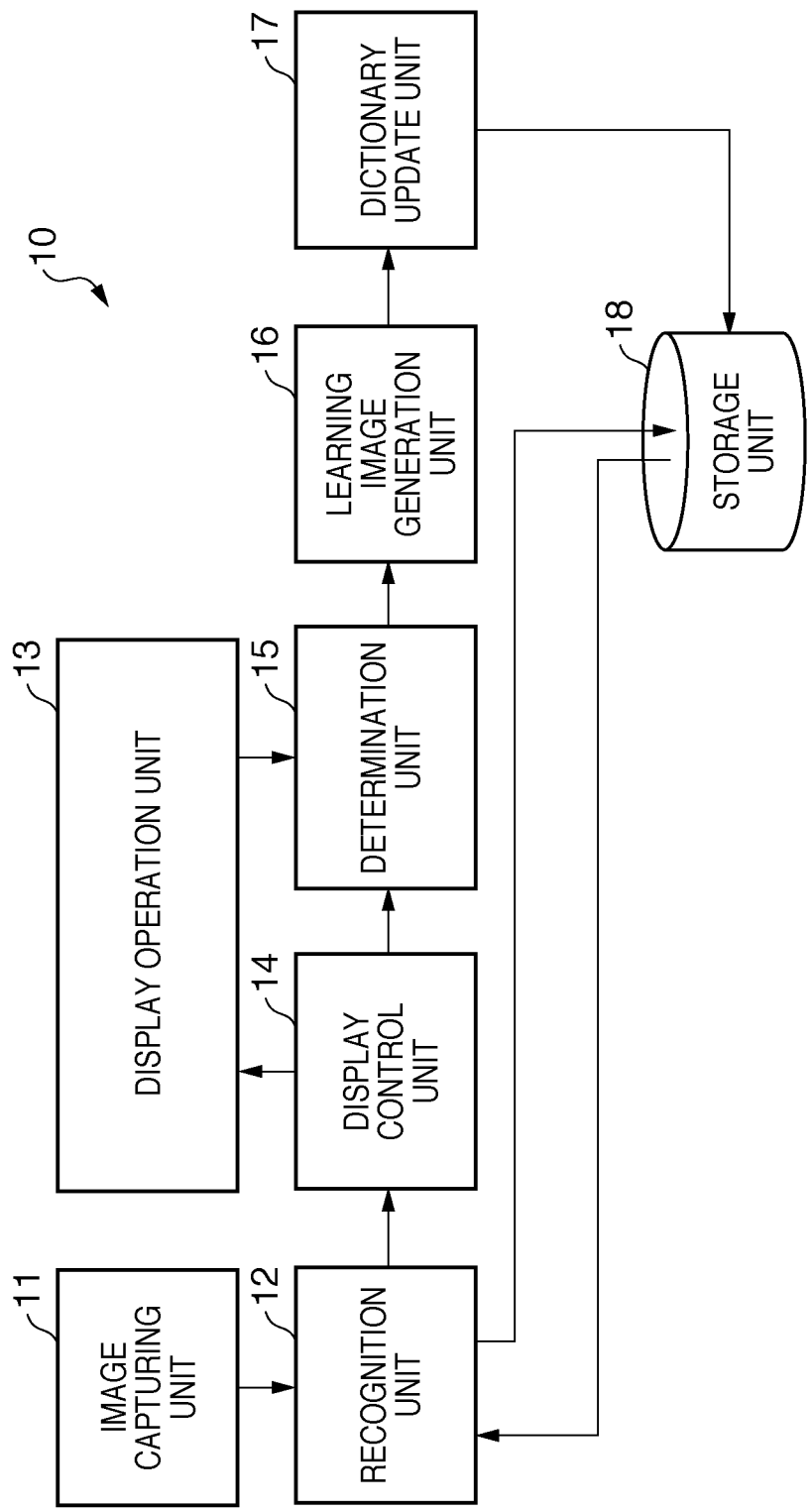
FIG. 1 shows an example configuration of a digital camera according to the present embodiment.

FIG. 1 shows an example configuration of a digital camera according to the present embodiment.

This digital camera 10 is configured with a built-in computer. Provided in the computer are, for example, a main control unit such as a CPU, and a storage unit including a ROM (Read Only Memory), a RAM (Random Access Memory), or the like. The computer may also be provided with a communications unit employing a network card, infrared, or the like, an input/output unit such as a display or a touch panel, and so forth. These respective constituent units are connected by a bus or the like, and are controlled by the main control unit executing programs stored in the storage unit.

Here, as functional configurations, the digital camera 10 is provided with, an image capturing unit 11, a recognition unit 12, a display operation unit 13, a display control unit 14, a determination unit 15, a learning image generation unit 16, a dictionary update unit 17, and a storage unit 18.

The image capturing unit 11, for example, is realized with a CCD (Charge-Coupled Device) or a CMOS (Complimentary Metal Oxide Semiconductor), and captures an image. The recognition unit 12 recognizes a predetermined pattern (in the present embodiment, the face of a dog) in image data that has been captured by the image capturing unit 11. In the present embodiment, by way of example, a case is described of adopting a method for recognizing the predetermined pattern based on a feature amount in a plurality of local regions.

The display operation unit 13 is configured to include an input unit that serves a function of inputting instructions from a user into the apparatus, and a display unit that serves a function of displaying various information to the user. In the present embodiment, by way of example, a case is described where the display operation unit 13 is realized by a touch panel. Note that the display operation unit 13 is not necessarily realized by a touch panel, and for example, may also be realized by a display and various buttons (such as a plus-shaped key and a set button).

The display control unit 14 performs display control of various screens in the display operation unit (display unit) 13. The display control unit 14, for example, displays a screen that includes image data, and also displays, enclosed by a rectangular frame or the like, one or a plurality of regions (partial regions) having a high likelihood of being the predetermined pattern in the image data, based on results of recognition by the recognition unit 12 (see FIG. 3, described below).

The determination unit 15 determines a negative region (incorrect pattern) from among the one or a plurality of partial regions based on an instruction input by the user via the display operation unit (input unit) 13. The learning image generation unit 16 generates a learning image based on the image of a region that has been determined to be a negative region by the determination unit 15.

The storage unit 18 stores a positive image (correct pattern) and a dictionary used when performing recognition processing by the recognition unit 12. The dictionary is used in order to recognize the predetermined pattern. The dictionary update unit 17 updates dictionary data based on the learning image that has been generated by the learning image generation unit 16.

Next, an example of operation of the digital camera 10 shown in FIG. 1 will be described with reference to FIG. 2. Here, a description is given of operation when setting a training mode. The training mode is a mode for updating the dictionary.

First the digital camera 10, in the image capturing unit 11, captures an image, and inputs image data into the apparatus (S101). Note that the image data is not necessarily input through image capture, and for example, may also be image data that has been stored in advance in the apparatus.

When image data is input, the digital camera 10, in the recognition unit 12, performs recognition processing, and recognizes the face of a dog in that image data (S102). This recognition is performed using a dog recognition dictionary that has been stored in the storage unit 18. The details of recognition processing will be described below.

When recognition processing finishes, the digital camera 10, in the display control unit 14, displays the image data that was captured by the image capturing unit 11 in the display operation unit 13 (display unit). At this time, as the recognition results in S102, for example, regions (partial regions) that possibly include the face of a dog are displayed, enclosed by a rectangular frame or the like, in the display operation unit 13 (display unit) (S103). Also, the display control unit 14, in order to prompt the user to input an instruction indicating whether or not the recognition results are correct, for example, displays a message to that effect. The user may also be prompted to input an instruction by an audio message (S104).

Figure 3:
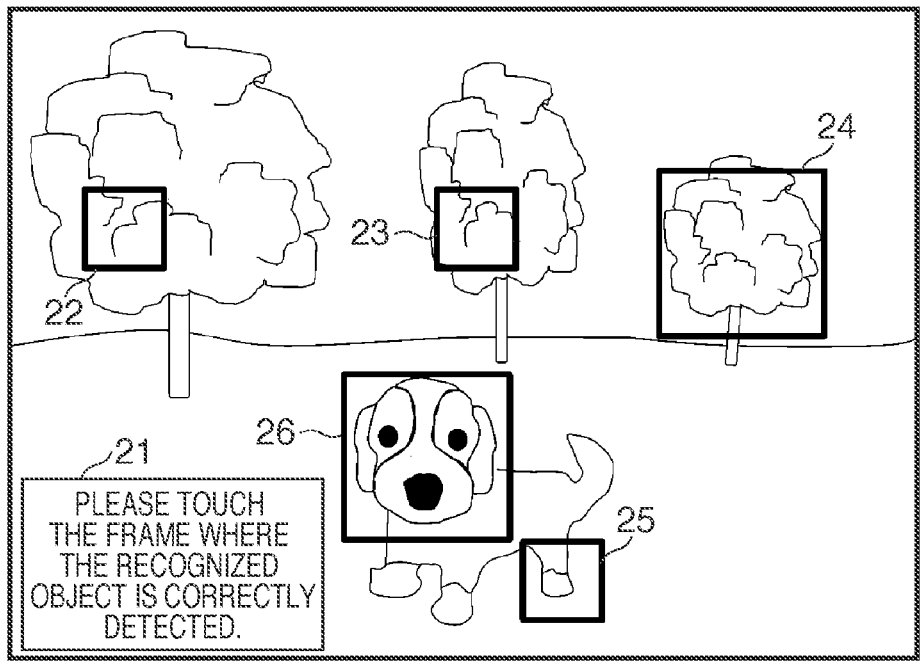
FIG. 3 shows an example of a display in a display operation unit 13 shown in FIG. 1.

Here, for example, the screen shown in FIG. 3 is displayed in the display operation unit 13 (display unit). In the case of FIG. 3, five rectangular frames 22 to 26 are being displayed as recognition results, and moreover, an item of information (message: "Please touch the frame where the recognized object is correctly detected.") 21 that prompts the user to input an instruction indicating whether or not the recognition results are correct is being displayed. The information that prompts the user to input an instruction indicating whether or not the recognition results are correct may also be expressed by, for example, an icon, an animation, or the like, rather than a message.

Here, the user performs an instruction indicating whether or not the recognition results are correct. In the present embodiment, the user instructs which partial region (rectangular frame) has been correctly recognized. Here, the user touches the rectangular frame (positive region) that is accurately recognized. Note that if the display operation unit 13 is configured not with a touch panel, but for example, with a display and various buttons (such as a plus-shaped key and a set button), the user selects a partial region using the plus-shaped key, and chooses the region that is accurately recognized with the set button. In such a configuration, in order to improve operability, for example, display may be performed by changing the color of a selected rectangular frame to a different color than other rectangular frames.

When an instruction is input by the user (YES in S105), the digital camera 10, in the determination unit 15, determines a partial region (rectangular frame) that is an incorrect pattern to be a negative region, based on that instruction input. That is, the rectangular frames (partial regions 22 to 25) that were not instructed in S105 are determined to be negative regions (S106). Here, the five partial regions 22 to 26 shown in FIG. 3 are regions that have been determined to have a high likelihood of being a dog in the recognition processing in S102. Therefore, among these regions, the four partial regions 22 to 25 for which an input instruction of being a correct region was not received from the user are regions that have a high likelihood of being the face of a dog, but are not the face of a dog. These four partial regions 22 to 25 are patterns whose shape or outline is similar to that of a dog, and therefore can be considered to be patterns that are likely to be mistakenly recognized.

When the determination of negative regions finishes, the digital camera 10, in the learning image generation unit 16, generates learning images based on the images of those negative regions (S107). For example, in the case of FIG. 3, learning images are generated based on the images of the partial regions 22 to 25. In the present embodiment, in this way, patterns that are likely to be mistakenly recognized are determined to be negative regions, and learning images are generated based on those regions. Because the size of the learning images is fixed, in the learning image generation unit 16, the negative regions are extracted from the image data, and the size of each extracted image is normalized and adjusted to the size for a learning image. In order to effectively generate a large quantity of learning images, a plurality of varying images obtained by minutely varying the angle, position, size, and so forth of a single learning image may be generated. In this case, in the learning image generation unit 16, along with extracting negative regions, learning images that include various image variations are generated by performing image processing such as rotation, enlargement/reduction, affine transformation, and so forth.

When generation of learning images finishes, the digital camera 10, in the dictionary update unit 17, performs incremental learning using the learning images that have been generated. Thus, the dictionary data stored in the storage unit 18 is updated (S108). The details of incremental learning will be described below.

Figure 2:
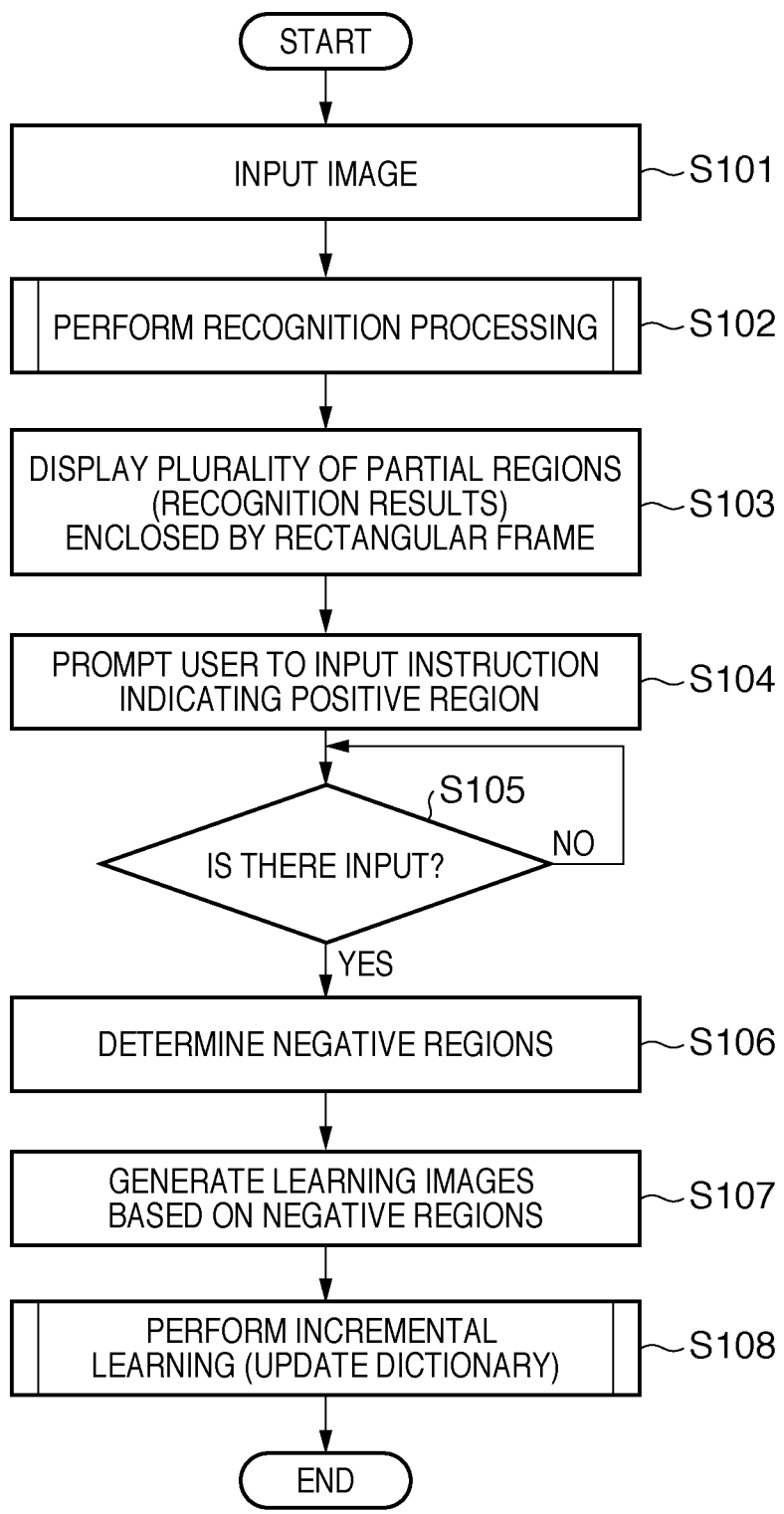
FIG. 2 is a flowchart that shows an example of operation of the digital camera 10 shown in FIG. 1.

Next is a description of details of the recognition processing shown in S102 in FIG. 2. Here, prior to describing the recognition processing, the dictionary stored in the storage unit 18 will be described.

Figure 4:
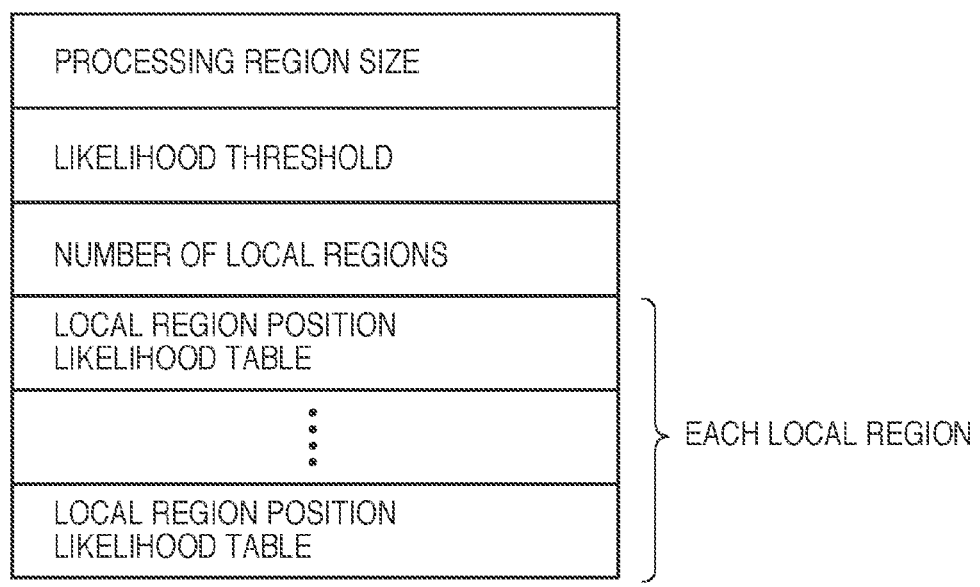
FIG. 4 shows an example of a dictionary stored in a storage unit 18 shown in FIG. 1.

As shown in FIG. 4, the dictionary includes, as dictionary data, "processing region size", "likelihood threshold", "number of local regions", "local region position", and "likelihood table". The "processing region size" indicates a number of vertical and horizontal pixels of a (rectangular-shaped) partial region extracted from the image in order to perform pattern recognition. The "likelihood threshold" is a threshold used in order to evaluate the likelihood of the partial region. The "number of local regions" indicates the number of local regions in the partial region. Each local region has processing parameters such as "local region position" (vertical and horizontal coordinates of the upper left and lower right of the local region), "likelihood table", and so forth. The "local region position" indicates the position of the local region within the partial region. The "likelihood table" holds a probability distribution of recognition targets and non-recognition targets corresponding to a predetermined feature amount. Values held in the "likelihood table" have been obtained in advance by machine learning, and are updated by incremental learning.

Here, an example flow of the recognition processing shown in S102 in FIG. 2 will be described with reference to FIG. 5. This processing is mainly performed in the recognition unit 12.

When the recognition processing starts, the recognition unit 12 first acquires the dictionary data of the dog recognition dictionary stored in the storage unit 18 (S201). Then, the image data (input image data) that was input in S101 in FIG. 2 is reduced to a predetermined ratio (S202). More specifically, because there are assumed to be various sizes of the predetermined pattern in the input image data, a plurality of reduced images obtained by reducing the image data by a predetermined ratio are generated. Thus, the image data is reduced so that the size of the partial region to be extracted is the "processing region size" (see FIG. 4) prescribed in the dictionary data.

Figure 6:
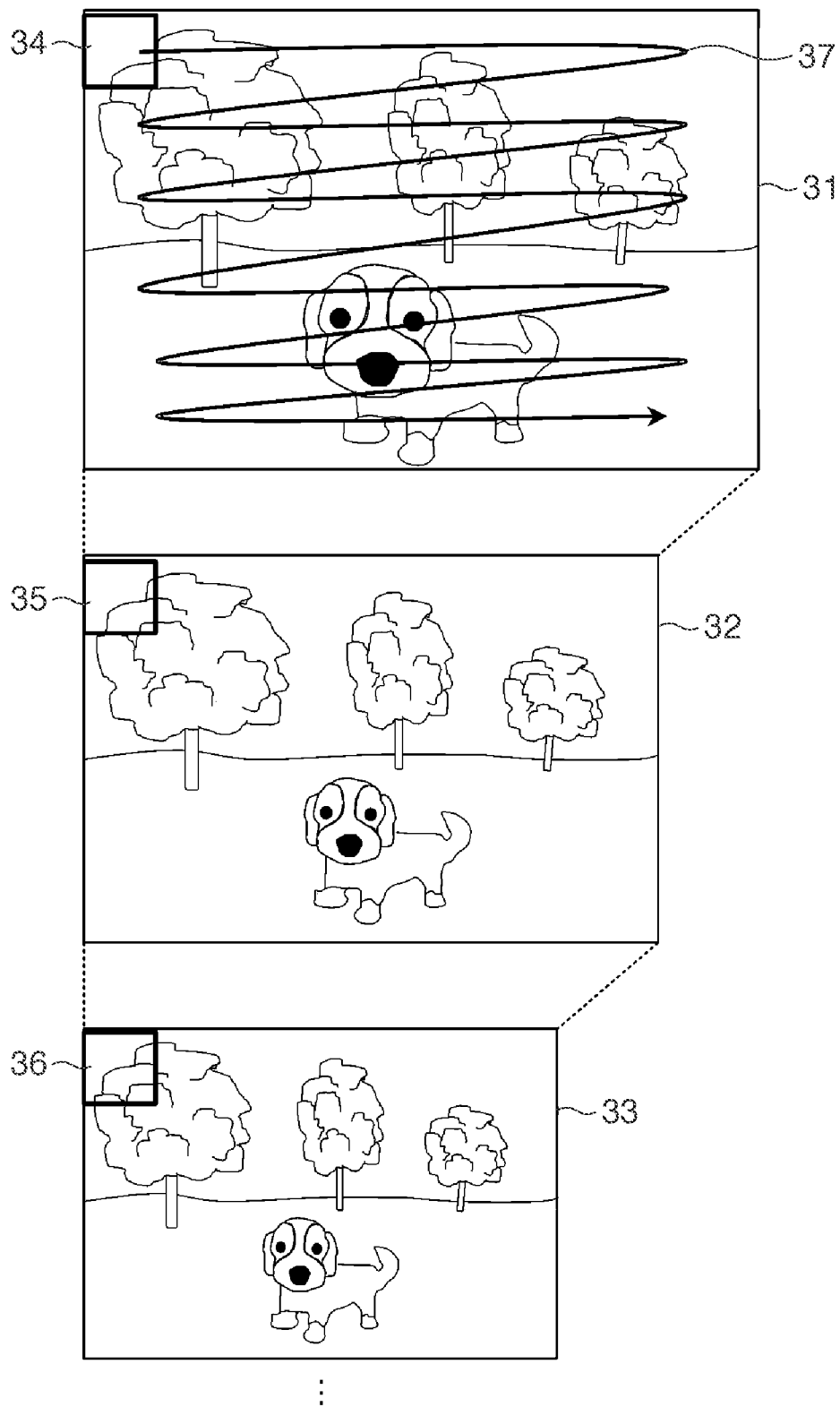
FIG. 6 shows an example overview of processing performed at the time of the recognition processing shown in FIG. 5.

Here, for example, if the size of the input image data is 640×480 pixels, a 0.8× reduction of that image data is repeatedly performed. After the image data of 640×480 pixels is reduced to image data of 512×384 pixels, the reduced image data of 512×384 pixels is furthermore reduced to image data of 410×307 pixels. This is performed repeatedly to generate a plurality of items of image data of different sizes. For example, as shown in FIG. 6, the result of reducing the item of input image data 31 is the item of image data 32, and the result of furthermore reducing the item of image data 32 is the item of image data 33. Also, partial regions 34 to 36 show cut-out rectangles in the respective items of image data. As indicated by arrow 37 in FIG. 6, for example, searching for the partial regions is performed by scanning in order from the upper left to the lower right in the image data. Thus, in the recognition unit 12, pattern recognition is performed by scanning within each item of reduced image data. Therefore, recognition can be performed regardless of the size of the predetermined pattern (face of a dog).

When the plurality of items of reduced image data is generated, the recognition unit 12 extracts partial regions from the plurality of items of image data (S203). At this time, in order to recognize the predetermined pattern, the recognition unit 12 calculates the feature amount of the extracted partial regions (S204). With this processing, first, the feature amount within each local region is calculated based on the "local region position" in the dictionary data that was acquired in S201. Haar-like features, a direction histogram, and so forth that are commonly known may be used for the feature amount.

When feature amount calculation finishes, the recognition unit 12 refers to the "likelihood table" in the dictionary table that was acquired in S201, and calculates a likelihood that corresponds to the value of the feature amount calculated in S204 (S205). Here, where the value of the feature amount in a particular local region is $f_k$, the probability that the local region is part of a recognition object (predetermined pattern) is $Pr(f_k|I_+)$, and the probability that the local region is part of a non-recognition object is $Pr(f_k|I_-)$. These probabilities $Pr(f_k|I_+)$ and $Pr(f_k|I_-)$ are calculated in advance by performing machine learning of a large quantity of learning images. A likelihood $C_k$ in the local region is as defined in Formula (1). That is, the ratio of the probability $Pr(f_k|I_+)$ and the probability $Pr(f_k|I_-)$ is calculated, and the logarithm thereof is used as the likelihood $C_k$.

$$C_k = \log[\{Pr(f_k | I_+)\} \div \{Pr(f_k | I_-)\}] \quad (1)$$
$$= C_{k+}(f_k) - C_{k-}(f_k)$$

However, $C_{k+}(f_k) = \log\{Pr(f_k|I_+)\}$, and
$C_{k-}(f_k) = \log\{Pr(f_k|I_-)\}$.

In order to calculate the likelihood within the local region, the "likelihood table" is configured such that it is possible to refer to the value of $C_{k+}(f_k)$ and the value of $C_{k-}(f_k)$ in above Formula (1). That is, a configuration may be adopted in which $Pr(f_k|I_+)$ and $Pr(f_k|I_-)$ are calculated in advance by machine learning, and values obtained by calculating the logarithm thereof are held in the "likelihood table".

The likelihood of the partial region is the sum of the likelihoods of the local regions within that partial region. That is, the likelihood C for the final recognition object is calculated using below Formula (2).

$$C = \sum_k C_{k+}(f_k) - \sum_k C_{k-}(f_k) \quad (2)$$

Next, the recognition unit 12, based on the likelihood of the partial region, detects a plurality of partial regions that satisfy the conditions indicated below as recognition results. In ordinary recognition processing, partial regions having a likelihood greater than a predetermined threshold are detected as recognition results. Therefore, if there is not a partial region that has a likelihood greater than the predetermined threshold, there will be no items of recognition results. On the other hand, in the present embodiment, it is assumed that at least one partial region can certainly be detected. Therefore, in the recognition unit 12, first, the respective partial regions are arranged in order of greatest likelihood based on the likelihood calculated in S205, and a predetermined number of partial regions beginning from the partial region having the greatest likelihood are detected as recognition results. Thus, one or a plurality of partial regions is certainly detected (S206). Note that for the partial regions that were acquired from the items of reduced image data 32 and 33 shown in FIG. 6, the position coordinates correspond to the coordinate system of the reduced image, so the coordinate values are multiplied by the inverse of the reduction ratio to convert to coordinate values in the original image.

Figure 7:
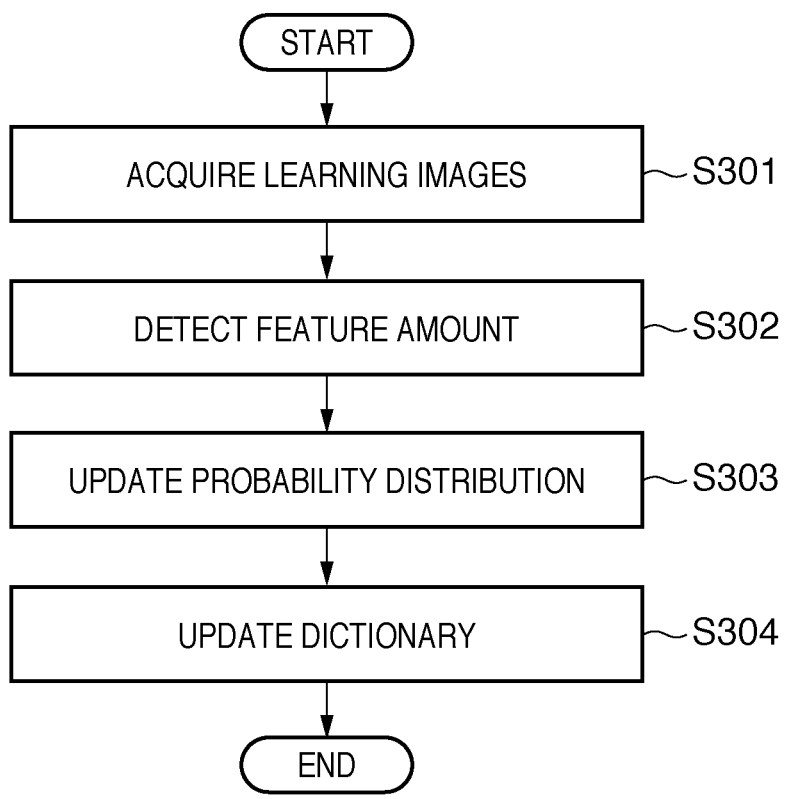
FIG. 7 is a flowchart that shows an example flow of incremental learning processing shown in S108 in FIG. 2.

Next, an example flow of the incremental learning processing shown in S108 in FIG. 2 will be described with reference to FIG. 7. For incremental learning, the methods proposed in Document 3 and in Nikunj C.Oza. and Stuart Russell, "Online Bagging and Boosting", Eighth International Workshop on Artificial Intelligence and Statistics, pp. 105-112, Morgan Kaufmann, Key West, Fla., USA, January 2001 (referred to below as Document 4) may be used. This processing is mainly performed in the dictionary update unit 17.

When the incremental learning processing starts, in the dictionary update unit 17, negative images that have been generated by the learning image generation unit 16 are acquired as learning images (S301). That is, the images that were generated in the processing in S107 in FIG. 2 are acquired. Then, feature amounts are calculated from the acquired negative images and the positive image stored in the storage unit 18 (S302). By this processing, feature amounts are calculated for all of the local regions within the dictionary data shown in FIG. 4.

Figure 5:
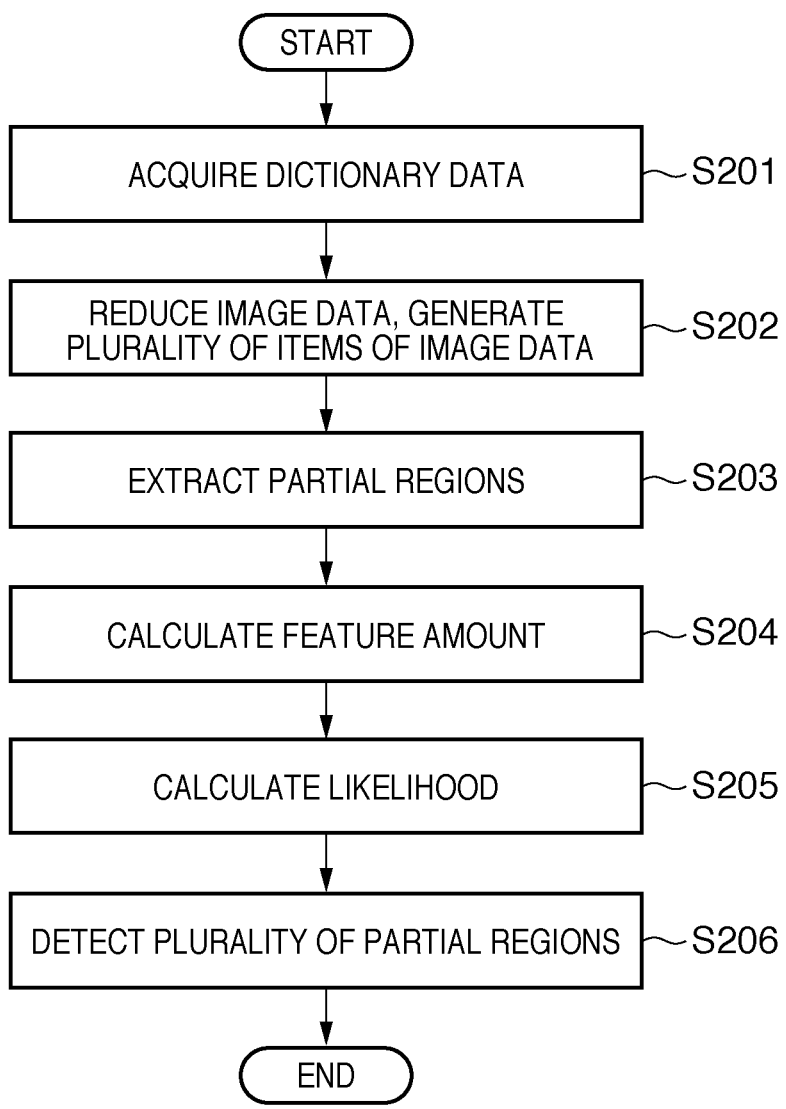
FIG. 5 is a flowchart that shows an example flow of recognition processing shown in S102 in FIG. 2.

Next, the dictionary update unit 17 updates the probability distributions $Pr(f_k|I_+)$ and $Pr(f_k|I_-)$ described in the processing of S204 in FIG. 5 (S303). Due to performing this update, the discrimination performance of each local region changes. Therefore, the dictionary update unit 17 reevaluates the discrimination performance of each local region, and again performs learning processing such that performance becomes optimal. Thus, the dictionary is updated (S304). A commonly known technique may be used for this learning processing. For example, in Document 4, reference is made to technology for performing a performance evaluation that also includes weighting of local regions based on updated probability distributions and learning images.

Updating the dictionary means, for example, in the dictionary data shown in FIG. 4, changing the order of the local region information (local region position and likelihood table) to an order by best discrimination performance, and also updating the likelihood table according to the probability distribution updating in S303.

According to Embodiment 1, as described above, a plurality of recognition results (partial regions) are detected, and recognition results (negative regions) that are incorrect patterns are determined based on a user input instruction for those recognition results. Then, incremental learning is performed using learning images generated based on the negative regions. That is, images that include a shape or outline very similar to the predetermined pattern serving as the recognition target are effectively collected as negative images, and incremental learning is performed based on the collected negative images. Thus, in particular, it is possible to effectively collect negative images that include a similar pattern that is likely to be mistakenly recognized as the predetermined pattern, and thus it is possible to improve recognition accuracy.

Embodiment 2

Next is a description of Embodiment 2. In Embodiment 1, a case was described of setting a training mode, and performing the above processing in that mode, but in Embodiment 2, a case is described of performing the above processing in an ordinary image capture mode. The configuration of the digital camera 10 according to Embodiment 2 is the same as in FIG. 1 used to illustrate Embodiment 1, so here a description of that configuration is omitted.

Figure 8:
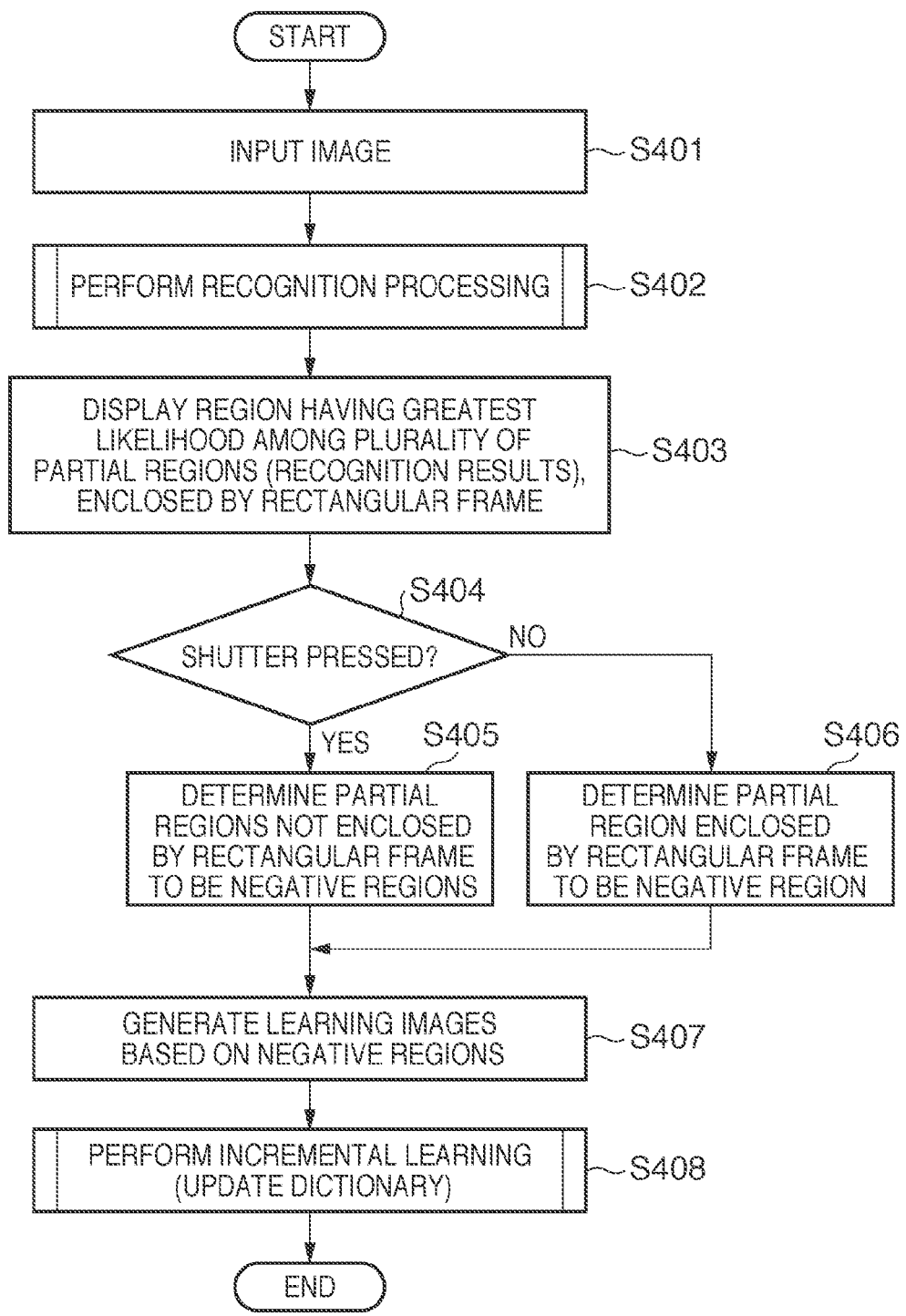
FIG. 8 is a flowchart that shows an example of operation of a digital camera 10 according to Embodiment 2.

FIG. 8 is a flowchart that shows an example of operation of the digital camera 10 according to Embodiment 2.

First, the digital camera 10 inputs image data into the apparatus via the image capturing unit 11 (S401). When image data is input, the digital camera 10, in the recognition unit 12, recognizes the face of a dog in that image data (S402). This recognition is performed with the same processing as in Embodiment 1.

Figure 9:
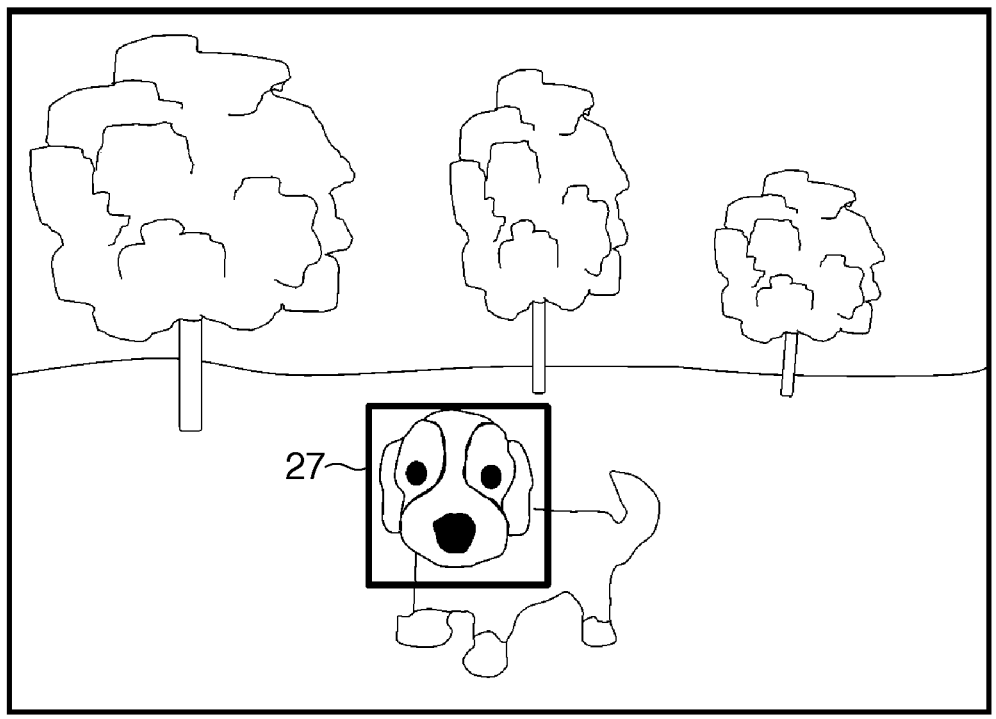
FIG. 9 shows an example of a display in the display operation unit 13 shown in FIG. 1.

When recognition processing finishes, the digital camera 10, in the display control unit 14, displays the image data that was input via the image capturing unit 11 in the display operation unit 13 (display unit). At this time, as the recognition results in S402, for example, regions (partial regions) that possibly include the face of a dog are displayed, enclosed by a rectangular frame, in the display operation unit 13 (display unit)(S403). At this time, unlike in Embodiment 1, as shown in FIG. 9, a region 27 of greatest likelihood among the partial regions that were detected by the recognition processing in S402 is displayed enclosed by a single rectangular frame. At this time, position information of the plurality of partial regions that were detected by the recognition processing is held within the digital camera 10. For example, if the partial regions 22 to 26 in FIG. 3 are detected as results of the recognition processing in S402, and the partial region 26 has the greatest likelihood among those partial regions, a rectangular frame is displayed only for that region, and position information is held for the remaining regions.

Here, the digital camera 10 detects whether or not the user has pressed a shutter button (or pressed a cancel button). When pressing of the shutter button is detected (YES in S404), the digital camera 10, in the determination unit 15, determines that the partial region corresponding to the rectangular frame being displayed is a positive region. Other partial regions (where a rectangular frame is not displayed) are determined to be negative regions (S405). Here, pressing of the shutter button by the user often means that the partial region corresponding to the rectangular frame being displayed is a correct pattern (positive region). Therefore, it is understood that partial regions other than that region are incorrect patterns, and so these regions are determined to be negative regions.

When pressing of the shutter button by the user is not detected, or pressing of the cancel button has been detected (NO in S404), the digital camera 10, in the determination unit 15, determines that the partial region corresponding to the rectangular frame being displayed is an incorrect region (S406).

Afterward, the digital camera 10, as in Embodiment 1, in the learning image generation unit 16, generates learning images based on the images of those negative regions (S407), and in the dictionary update unit 17, performs incremental learning using the learning images that were generated. Thus, the dictionary stored in the storage unit 18 is updated (S408).

In Embodiment 2, as described above, negative regions are determined according to user instruction input during an ordinary image capture mode. Therefore, it is possible to collect learning images (positive images and negative images) without switching modes in order to perform incremental learning.

Embodiment 3

Next is a description of Embodiment 3. In Embodiment 3, a case of application to moving image data is described. The configuration of the digital camera 10 according to Embodiment 3 is the same as in FIG. 1 used to illustrate Embodiment 1, so here a description of that configuration is omitted.

FIG. 10 is a flowchart that shows an example of operation of the digital camera 10 according to Embodiment 3. Here, operation when a training mode is set will be described. The training mode is a mode for updating a dictionary.

First, the digital camera 10, in the image capturing unit 11, inputs moving image data into the apparatus (S501). When moving image data (a plurality of items of image data that are continuous in time) is input, the digital camera 10, in the recognition unit 12, executes the same recognition processing as in Embodiment 1 on the first frame of moving image data (S502). Then, the processing of S103 to S107 in FIG. 2 used to illustrate Embodiment 1 is performed on that first frame of moving image data, and learning images are generated (S503 to S507). Here, the generated learning images will be used in subsequent processing, and therefore are held in a RAM or the like, for example.

Here, the digital camera 10 advances processing to the next frame. Specifically, the digital camera 10 acquires the next frame (referred to below as the present frame)(S508), and performs track processing of the negative regions that were detected in the prior frame (S509). Thus, in the present frame, the position of regions that correspond to negative regions of the prior frame are acquired. The track processing may be performed using commonly known technology, so here, a detailed description thereof is omitted. For example, a pattern matching technique described in Japanese Patent Laid-Open No. 05-298591, or a technique of detecting movement vectors of feature points described in Japanese Patent Laid-Open No. 2003-44860, may be used.

Next, the digital camera 10 generates learning images by the same method as in Embodiment 1 based on the tracked negative regions (S510). Here, the generated learning images will be used in subsequent processing, and therefore are held in a RAM or the like, for example.

Afterward, the digital camera 10 determines whether or not the present frame is the final frame. If not the final frame (NO in S511), the routine returns to the processing in S508, and the above processing is repeated until the present frame is the final frame. If the present frame is the final frame (YES in S511), then the digital camera 10 performs incremental learning by the same method as in Embodiment 1, using the learning images held in the RAM or the like in the processing of S507 and S510 (S512).

According to Embodiment 3, as described above, negative regions that have been instructed by the user are tracked in frames that are continuous in time. Thus, it is possible to acquire the negative regions of each frame in the moving image data. Therefore, it is possible to effectively collect a large quantity of learning images based on the negative regions.

In Embodiment 3, by way of example, a case is described in which track processing is performed to track negative regions, and thus learning images are collected based on the negative regions, but the invention is not limited to this. For example, processing can likewise be performed for positive regions.

Also, in the processing of S502 in FIG. 10, recognition processing is performed for the first frame of moving image data, but the invention is not limited to this. For example, recognition processing may be performed for an arbitrary frame of moving image data. In this case, in the processing in S508, a frame that is continuous afterward in time relative to the frame for which recognition processing was performed may be acquired, or a frame may be acquired that is continuous previous in time.

The above are examples of representative embodiments of the present invention, but the present invention is not limited to the embodiments described above and shown in the drawings; appropriate modifications are possible within a range not departing from the gist of the invention.

For example, in Embodiments 1 to 3, nothing is said with respect to the number of dictionaries that are stored in the storage unit 18, but there may be one dictionary stored or there may be a plurality of dictionaries stored. For example, a plurality of dictionaries may be stored in order to recognize separate patterns. In this case, it is necessary to provide a unit that allows a user to select one among the plurality of dictionaries, or the like, and to allow the user to recognize the presently operating dictionary.

Also, in Embodiments 1 to 3, when performing incremental learning based on a positive image, a positive image that has been stored in advance in the storage unit 18 is used, but this is not a limitation. A configuration may also be adopted in which also in the case of a positive image, similar to the case of negative images, a positive region is detected based on a user instruction, and incremental learning is performed based on the detected positive region.

Also, in Embodiments 1 to 3, by way of example, a case in described in which the user is caused to indicate a positive region, but the present invention is not limited to this; the user may also be caused to indicate negative regions. In this case, a configuration may be adopted in which learning images are generated based on the instructed negative regions, and the dictionary is updated based on those images.

Also, in Embodiments 1 to 3, by way of example, a case is described in which, as information indicating recognition results (partial regions) of recognition processing, those regions are enclosed by a rectangular frame, but the present invention is not limited to this. For example, partial regions may also be indicated by an arrow, a circular frame, or the like.

Also, above Embodiments 2 and 3 may be combined. That is, the processing described in above Embodiment 3 may be performed when in a moving image capture mode. In this case, a configuration may be adopted in which pressing of a moving image capture start button is detected instead of detecting pressing of the shutter button.

A system, an apparatus, a method, a program, a storage medium, or the like, for example, can be adopted as the mode of the present invention. Specifically, the present invention may be applied to a system configured from a plurality of devices, or may be applied to an apparatus configured from a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241887 filed on Oct. 20, 2009, which is hereby incorporated by reference herein in its entirety.

What is claimed is:

1. An image recognition apparatus, comprising:
    a storage unit configured to store a dictionary used to recognize a predetermined pattern;
    a recognition unit configured to detect in image data using the dictionary, as predetermined patterns, a plurality of partial regions having a likelihood of being the predetermined pattern greater than a predetermined threshold;
    a display unit configured to display the image data, and also display information indicating the plurality of partial regions detected as the predetermined patterns;
    an accepting unit configured to accept a positive region specified by a user from among the detected predetermined patterns;
    a determination unit configured to determine the detected predetermined patterns other than the specified positive region as a negative region;
    a generation unit configured to generate a negative learning sample image based on the determined negative region; and
    an update unit configured to update the dictionary based on the negative learning sample image.

2. The image recognition apparatus according to claim 1, wherein when a region in the partial regions has been designated by the user, the accepting unit accepts that partial regions other than the designated region are specified as negative regions.

3. The image recognition apparatus according to claim 1, further comprising:
    an output unit configured to output information for prompting the user to designate a region that includes the predetermined pattern from among the plurality of partial regions, when the image data and information indicating the plurality of partial regions is being displayed in the display unit.

4. The image recognition apparatus according to claim 1, wherein when a region has been designated by the user, the accepting unit accepts that the designated region is specified as the positive region.

5. An image recognition apparatus, comprising:
    an image capturing unit configured to capture an image;
    a storage unit configured to store a dictionary used to recognize a predetermined pattern;
    a recognition unit configured to detect in image data that has been input via the image capturing unit using the dictionary, as recognition results, a plurality of partial regions having a likelihood of being the predetermined pattern greater than a predetermined threshold, using the dictionary;
    a display unit configured to display the image data, and also display information indicating the partial region having the greatest likelihood among the plurality of partial regions;
    an accepting unit configured to accept a negative region specified by a user from among the plurality of partial regions, wherein the accepting unit, when the user confirms the image data being displayed, accepts that partial regions other than the region having the greatest likelihood are specified as negative regions;
    a generation unit configured to generate a negative learning sample image based on the specified negative region; and
    an update unit configured to update the dictionary based on the negative learning sample image.

6. The image recognition apparatus according to claim 5, wherein when the user instructs cancellation of a region that was detected by the recognition unit, the accepting unit accepts that the partial region having the greatest likelihood is specified as the negative region.

7. An image recognition apparatus, comprising:
a storage unit configured to store a dictionary used to recognize a predetermined pattern;
a recognition unit configured to detect in image data using the dictionary, as recognition results, a plurality of partial regions having a likelihood of being the predetermined pattern greater than a predetermined threshold;
a display unit configured to display the image data, and also display information indicating the plurality of partial regions;
an accepting unit configured to accept a negative region specified by a user from among the plurality of partial regions;
a generation unit configured to generate a negative learning sample image based on the specified negative region; and
an update unit configured to update the dictionary based on the negative learning sample image, wherein
the recognition unit performs the partial region detection for at least one item among a plurality of items of image data that are continuous in time,
the accepting unit, when a region has been designated by the user, accepts that the partial regions other than the designated region are specified as negative regions, and in the plurality of items of image data that are continuous in time, tracks the negative regions in image data that is continuous in time with the image data on which the recognition processing was performed, and accepts negative regions in that image data, and
the generation unit generates negative learning sample images based on the negative regions that were accepted by the accepting unit from the plurality of items of image data that are continuous in time.

8. A processing method in an image recognition apparatus, the method comprising:
storing in a storage unit a dictionary used to recognize a predetermined pattern;
detecting in image data using the dictionary, as predetermined patterns, a plurality of partial regions having a likelihood of being the predetermined pattern greater than a predetermined threshold;
displaying on a display unit the image data, and also displaying information indicating the plurality of partial regions detected as the predetermined patterns;
accepting a positive region specified by a user from among the detected predetermined patterns;
determining the detected predetermined patterns other than the specified positive region as a negative region;
generating a negative learning sample image based on the determined negative region; and
updating the dictionary based on the negative learning sample image.

9. A non-transitory computer-readable storage medium storing code of a computer program for causing a computer to execute a processing method in an image recognition apparatus, the program comprising:
code for storing in a storage unit a dictionary used to recognize a predetermined pattern;
code for detecting in image data using the dictionary, as predetermined patterns, a plurality of partial regions having a likelihood of being the predetermined pattern greater than a predetermined threshold;
code for displaying the image data, and also displaying information indicating the plurality of partial regions detected as the predetermined patterns;
code for accepting a positive region specified by a user from among the detected predetermined patterns;
code for determining the detected predetermined patterns other than the specified positive region as a negative region;
code for generating a negative learning sample image based on the determined negative region; and
code for updating the dictionary based on the negative learning sample image.

* * * * *